Figure 1:
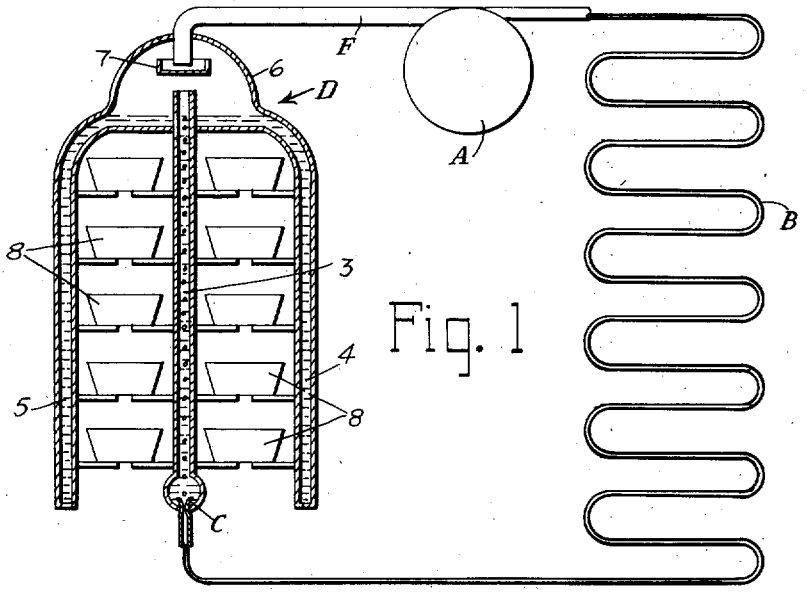

R. W. DAVENPORT

Oct. 11, 1932. EVAPORATOR FOR REFRIGERATING SYSTEMS Re. 18,621

Original Filed April 5, 1927

INVENTOR.
Ransom W. Davenport

BY

Ira L. Nickerson
ATTORNEY.

Reissued Oct. 11, 1932

Re. 18,621

UNITED STATES PATENT OFFICE

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY

EVAPORATOR FOR REFRIGERATING SYSTEMS

Original No. 1,769,116, dated July 1, 1930, Serial No. 181,076, filed April 5, 1927. Application for reissue filed June 30, 1932. Serial No. 620,214.

This invention relates to refrigerating apparatus with particular reference to small mechanically operated refrigerating outfits, such as those intended for household use, in which it is desirable to freeze liquid in a relatively small chamber, while sufficient heat is extracted from a larger chamber in which perishable articles, such as food may be preserved. More particularly, the invention relates to refrigerating systems of the closed cycle type utilizing as the refrigerant fluid a physical mixture of an evaporable liquid and of a gas substantially inert to and insoluble in the liquid, such as disclosed and claimed in my Patent No. 1,619,194 of March 1st, 1927, and operating in accordance with the process disclosed and claimed in my Patent No. 1,619,196 of March 1st, 1927.

One object of the invention is to provide improved means for evaporating a liquid to effect refrigeration at a plurality of temperatures and at a single total pressure. Another object is to utilize the refrigerating effect primarily for freezing. Still another object is to provide a simple and compact evaporator unit adapted to be disposed in a food chamber and to effect freezing of liquids while protecting the food chamber from the low temperature of the freezing compartment. Other objects will be apparent from the detailed description which follows:

Refrigerating systems which operate by straight evaporation, as in the reversed Clausius-Rankine cycle, provide means for extracting heat from both the freezing chamber and the refrigerating chamber at the same freezing temperature. In previous disclosures, such as my patent application No. 105,372 filed April 29th, 1926, I have set forth systems operating on the vapor-gas principle for evaporating liquids in a plurality of spaced evaporators into one or all of which the gas and vapor mixture of the refrigerant is expanded. Such previous arrangements provide that the evaporators be spaced laterally or vertically and be surrounded by zones or chambers operating at different temperatures.

The present invention aims to effect refrigeration in zones operating at different temperatures also but with the distinction that one zone is inside the other. In the preferred arrangement the colder zone, for freezing water and other liquids, is contained within the higher temperature zone. In practice at least two evaporators are used, one of the evaporators being at least partly enclosed by the other. Means are provided for causing two evaporators to absorb heat at different temperatures. This may be effected by utilizing the vapor-gas principle and causing the expansion of the vapor-gas stream into the inner evaporator either solely or primarily. A single compressor may be arranged to provide the reduced pressure in both evaporators.

Figure 2:
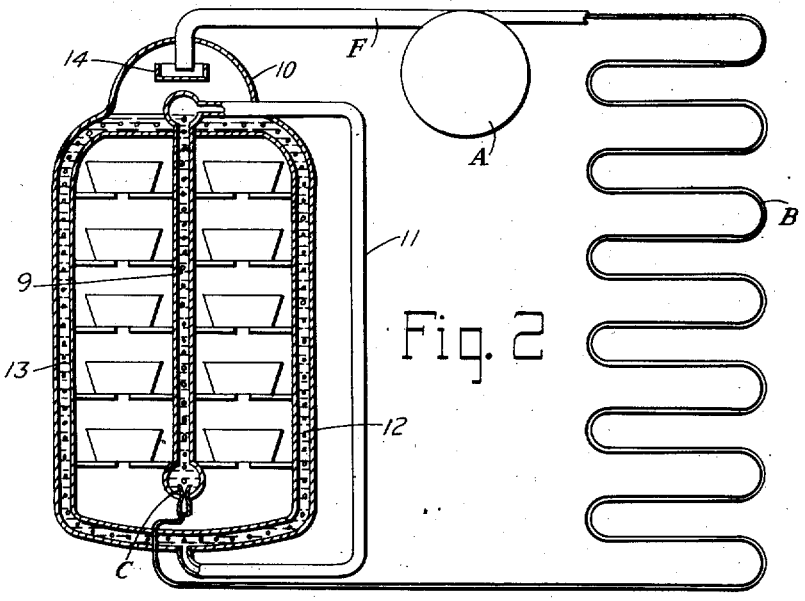

In order to illustrate the invention concrete embodiments thereof are shown in the accompanying drawing in which:

Figs. 1 and 2 are largely diagrammatic views of closed cycle refrigerating systems in which the evaporating means are shown in vertical section, the evaporators in Fig. 1 operating partly on the vapor-gas principle and partly straight cycle while the evaporators in Fig. 2 operate entirely on the vapor-gas principle.

The closed cycle systems shown in Figs. 1 and 2 each have a pump or compressor A and a condenser B, these elements being of any suitable or desired type. The fluid withdrawn from the evaporator means by pump A is discharged into condenser B at higher temperature and pressure where it gives up its heat and the condensed liquid together with the gas and residual vapor in the system is fed back into one of the evaporator members through suitable means for passing both liquid and gas, such for example as a Venturi nozzle C or other fixed or variable orifice. The evaporating units may resemble in exterior configuration the conventional forms of evaporators heretofore used in the conventional or Rankine cycle systems.

Evaporator unit D in Fig. 1 comprises an inner evaporator 3 arranged to be at least partly enclosed by additional evaporators 4 and 5. All the evaporators open into a header 6, the outlet of evaporator 3 being by preference at a higher level than the outlets of evaporators 4 and 5. Pump A withdraws vapor and gas from header 6 through a connection F, the inlet of which is disposed closely adjacent to the bottom of a receptacle 7 which may serve as a baffle plate and catch liquid passing toward the pump. As shown, feeding device C opens into the bottom of evaporator 3 which contains liquid refrigerant and the products of condenser B are expanded directly thereinto so that this evaporator operates on the vapor-gas principle producing a high absorption of heat from its immediate surroundings and creating a freezing zone within evaporator D. The space between the evaporator may be used to contain receptacles 8 for water or other liquids to be frozen. The whole structure may be mounted in the usual way in the refrigerating chamber of a domestic refrigerator. Evaporators 4 and 5 also contain refrigerant liquid which is subjected only to the low pressure produced to pump A so that evaporation takes place only on the surface of the liquid in these two evaporators which surface is in header 6, or adjacent thereto, with the result that evaporators 4 and 5 operate on the conventional or straight pumping cycle.

With the above arrangement the operation is as follows: Upon starting the system, the liquid in receptacles 8 is first frozen into ice by the low temperature effect of the inner evaporator 3 before the outer evaporators 4 and 5 get very cold, although they are of course picking up some heat from the refrigerating chamber. After operating for some time the latent heat of freezing is all or nearly all absorbed and the expansion in the central evaporator 3 becomes nearly adiabatic. By the time that ice is formed the outer evaporators 4 and 5 begin to get cold enough to pick up heat from the refrigerating chamber at a high rate, thereby more rapidly cooling the air therein down to the required temperature. Thus the effect is to first rapidly freeze the liquid and then cool the refrigerating chamber.

The evaporating means in Fig. 2 comprises a central or inner evaporator 9 into which the products of condenser B are discharged through feeding device C so that this evaporator operates on the vapor-gas principle. Instead of discharging into header 10 to which pump A is connected, the partly expanded gas together with the vapor of the refrigerant liquid released in evaporator 9 is arranged to discharge into the enclosing evaporators 12 and 13 as by pipe 11. By preference evaporators 12 and 13 are interconnected at the bottom forming in effect a single evaporator and pipe 11 may lead to the interconnecting portion of evaporators 12 and 13. Outer evaporators 12, 13 are thus in series with evaporator 9 and open into header 10 from which leads pipe F to pump A. The inlet for pipe F may be disposed within a baffle member 14 as in the evaporator unit shown in Fig. 1. Since evaporators 12 and 13 are in series with evaporator 9 and since the latter receive the initial expansion of the fluid from condenser B, evaporators 12 and 13 will operate at a higher temperature than evaporator 9 in accordance with the disclosure relative to differential temperatures in systems operating on the vapor-gas principle as set forth in my copending application, Serial No. 77,156, filed December 22, 1925, which issued August 14, 1928, as Patent No. 1,680,453.

From the above it will be apparent that the present invention aims to produce freezing of liquid within the refrigerating chamber while protecting the latter against the freezing temperature through the interposition of an additional evaporator which operates at a higher temperature.

While preferred forms of the invention have been herein shown and described, it is to be understood that the invention is not limited to the specific details thereof, but covers all changes, modifications and adaptations within the scope of the appended claims.

I claim as my invention:

1. A refrigerating system of the closed cycle type operating on the vapor-gas principle having evaporator means operating at a plurality of vapor pressures for providing two temperature zones, one of said zones being within the other.

2. A refrigerating system of the closed cycle type operating on the vapor-gas principle having evaporator means operating at a plurality of vapor pressures for providing a higher temperature zone and a lower temperature zone, the lower temperature zone being within the higher temperature zone.

3. A refrigerating system having an evaporator unit, a compressor, and a condenser, said parts being connected together to form a closed cycle system, said unit comprising an inner evaporator and an outer evaporator at least partly enclosing said inner evaporator, and means for effecting absorption of heat by said inner evaporator at a lower temperature than by said outer evaporator.

4. A refrigerating system having an evaporator unit, a compressor, and a condenser, said parts being connected together to form a closed cycle system, said unit comprising an inner evaporator and an outer evaporator at least partly enclosing said inner evaporator, and means for operating said inner evaporator on the vapor-gas principle and for operating said outer evaporator at a higher temperature than said inner evaporator.

5. A refrigerating system having an evaporator unit, a compresser, and a condenser, said parts being connected together to form a closed cycle system, said unit comprising an inner evaporator and an outer evaporator at least partly enclosing said inner evaporator, and means for operating both said evaporators on the vapor-gas principle but effecting initial expansion of the refrigerant medium in said inner evaporator.

6. In a refrigerating system the combination with a compressor and a condenser of an evaporator for liquid, means to feed liquid and gas from said condenser into said evaporator, a second evaporator partly surrounding said first evaporator, means to supply liquid to said second evaporator, and means to conduct vapor from both evaporators to said compressor.

7. In a refrigerating system the combination with a compressor and a condenser of an evaporator for liquid, means to feed liquid and gas from said condenser into said evaporator, a second evaporator partly surrounding said first evaporator, a header to which said evaporators are connected, and means connecting said header and said compressor.

8. In a refrigerating system the combination with a compressor and a condenser of an evaporator for liquid, means to feed liquid and gas from said condenser into said evaporator, a second evaporator partly surrounding said first evaporator, a header to which said evaporators are connected, a connection from said header to said compressor, and baffle means in said header adjacent the inlet to said connection.

9. An evaporator unit for refrigerating systems operating on the vapor-gas principle comprising a plurality of evaporators, a header to which said evaporators are connected, and connections whereby one of said evaporators may be operated at a lower temperature than the remaining evaporators.

10. An evaporator unit for refrigerating systems operating on the vapor-gas principle comprising a central evaporator, additional evaporators at least partly surrounding said central evaporator, means interconnecting said evaporators to permit a single pump to withdraw vapor from all said evaporators and operating said central evaporator at a lower temperature than the other evaporators.

11. An evaporator unit for refrigerating systems operating on the vapor-gas principle comprising a plurality of evaporators, a header to which said evaporators are connected, said evaporators being disposed in spaced relation to permit the placing therebetween of containers for liquids to be frozen, and connections whereby one of said evaporators may be operated at a lower temperature than the remaining evaporators.

12. An evaporator unit for refrigerating systems operating on the vapor-gas principle comprising a central evaporator, additional evaporators spaced from said central evaporator and at least partly enclosing the latter, a header for said evaporators, and means interconnecting said evaporators so that fluid entering said unit passes upwardly twice before reaching said header.

13. An evaporator unit for refrigerating systems operating on the vapor-gas principle comprising a plurality of evaporators, a header to which said evaporators are connected, an outlet connection from said header, a liquid collecting baffle within said header beneath said connections, and an inlet connection to one of said evaporators to cause the same to operate at a lower temperature than the remainder of said evaporators.

14. An evaporator unit for refrigerating systems operating on the vapor-gas principle comprising a central evaporator, additional evaporators spaced from said central evaporator and at least partly enclosing the latter, a header for said evaporators, an outlet connection from said header, a liquid collecting baffle in said header beneath said connection, and means connecting said evaporators in series to cause fluid entering said unit to pass upwardly twice in a continuous path before reaching said header.

15. In a refrigerating system, an evaporator comprising a header, means for containing liquid refrigerant connected to said header and communicating therewith, said means forming a cooling compartment below said header, another means having a passageway therethrough arranged within said cooling compartment, and means for supplying refrigerant to said header through said passageway.

16. In a refrigerating system, an evaporator comprising a header, means for containing liquid refrigerant connected to said header and communicating therewith, said means forming a cooling compartment below said header, another means having a passageway therethrough arranged within said cooling compartment, both said means being arranged to maintain articles placed in said cooling compartment at substantially a freezing temperature, and means for supplying refrigerant to said header through said passageway.

17. In a refrigerating system the combination with a compressor and a condenser of an evaporator for liquid, means to feed refrigerant from said condenser into said evaporator, a second evaporator partly surrounding said first evaporator, means to supply liquid to said second evaporator, and means to conduct vapor from both evaporators to said compressor.

18. In a refrigerating system the combination with a compressor and a condenser of an evaporator for liquid, means to feed refrigerant from said condenser into said evaporator, a second evaporator partly surrounding said first evaporator, a header to which said evaporators are connected, and means connecting said header and said compressor.

Signed at Detroit, Michigan, this 21st day of June, 1932.

RANSOM W. DAVENPORT.